(12) United States Patent
Shang et al.

(10) Patent No.: US 11,422,696 B2
(45) Date of Patent: Aug. 23, 2022

(54) REPRESENTATION OF USER INTERFACE INTERACTIVE REGIONS

(71) Applicants: MICRO FOCUS LLC, Santa Clara, CA (US); Er-Xin Shang, Shanghai (CN); Wen-Jie Qian, Shanghai (CN); Haiyu Gao, Shanghai (CN)

(72) Inventors: Er-Xin Shang, Shanghai (CN); Wen-Jie Qian, Shanghai (CN); Haiyu Gao, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/430,488

(22) PCT Filed: Feb. 25, 2019

(86) PCT No.: PCT/CN2019/076040
§ 371 (c)(1),
(2) Date: Aug. 12, 2021

(87) PCT Pub. No.: WO2020/172765
PCT Pub. Date: Sep. 3, 2020

(65) Prior Publication Data
US 2022/0129148 A1   Apr. 28, 2022

(51) Int. Cl.
*G06F 3/04886*  (2022.01)
*G06F 3/0489*   (2022.01)
(Continued)

(52) U.S. Cl.
CPC ........ *G06F 3/04886* (2013.01); *G06F 3/0482* (2013.01); *G06F 3/0489* (2013.01); *G06F 3/1462* (2013.01); *G06F 9/451* (2018.02)

(58) Field of Classification Search
CPC .. G06F 3/04886; G06F 3/0482; G06F 3/0489; G06F 3/1462; G06F 9/451
See application file for complete search history.

(56) References Cited

U.S. PATENT DOCUMENTS 9,274,932 B2    3/2016  Crossley
2011/0310041 A1* 12/2011 Williams ............ G06F 11/3696
                                                345/173
(Continued)

FOREIGN PATENT DOCUMENTS

CN    104657141    9/2017
CN    107209625    9/2017

OTHER PUBLICATIONS

Amalfitano et al. "A GUI Crawling-based technique for Android Mobile Application Testing," 2011 IEEE Fourth International Conference on Software Testing, Verification and Validation Workshops, Mar. 2011, Berlin, Germany, 10 pages.
(Continued)

*Primary Examiner* — Jeanette J Parker (57) ABSTRACT

In some examples, a system executes a program that generates a user interface (UI) screen, provides a user input event to the program during execution, and captures images of the UI screen before and after the user input event. The system determines, based on the captured images, whether a first region of the UI screen changed in response to the user input event, and indicates the first region as a user interactive region and adds an element representing the user interactive region to a representation of user interactive regions of a UI of the program.

20 Claims, 5 Drawing Sheets

(51) Int. Cl.
   *G06F 9/451*    (2018.01)
   *G06F 3/14*     (2006.01)
   *G06F 3/0482*   (2013.01)

(56) References Cited

U.S. PATENT DOCUMENTS

| | | |
|---|---|---|
| 2014/0245215 A1 | 8/2014 | Rydenhag et al. |
| 2015/0356669 A1 | 12/2015 | Roescheisen et al. |
| 2017/0060368 A1 | 3/2017 | Kochura |
| 2017/0177465 A1* | 6/2017 | Li .................... G06F 11/3684 |
| 2018/0157386 A1 | 6/2018 | Su |
| 2018/0329813 A1* | 11/2018 | Hamid ................ G06F 11/3696 |

OTHER PUBLICATIONS

Hu et al. "DroidWalker: Generating Reproducible Test Cases via Automatic Exploration of Android Apps," arXiv:1710.08562v1, Oct. 2017, 6 pages.
Nguyen et al. "GUITAR: An Innovative Tool for Automated Testing of GUI-Driven Software," Automated Software Engineering, 2014, vol. 21, pp. 65-105.
International Search Report and Written Opinion prepared by the ISA/CN dated Aug. 27, 2019, for International Application No. PCT/CN2019/076040.

\* cited by examiner

REPRESENTATION OF USER INTERFACE INTERACTIVE REGIONS

CROSS-REFERENCE TO RELATED APPLICATIONS

This application is a national stage application under 35 U.S.C. 371 and claims the benefit of PCT Application No. PCT/CN2019/076040 having an international filing date of 25 Feb. 2019, which designated the United States, the entire contents of which are incorporated herein by reference.

BACKGROUND

Program testing is performed to verify that a program is functioning according to target specifications or without errors. A program can refer to software, firmware, or other types of machine-readable instructions. Bugs in a program can cause issues that lead to abnormal behavior of the program.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Program testing involves detecting issues in a program that cause the program to behave abnormally. A program includes machine-readable instructions, such as those of software and/or firmware. Based on the testing, the program can be debugged to eliminate the issues. In some cases, program testing can be performed manually, with a user interacting with the program while the program executes. For example, the user can make user input selections in a graphical user interface (GUI) of the program during execution of the program. Once issues are detected based on interactions between the user and the program, quality assurance personnel may attempt to recreate the issues during a debugging process. In a manual debugging process, the quality assurance personnel identifies user actions with respect to the GUI that led to the discovery of an issue, and repeats the user actions to recreate the issue. In an automated debugging process, a test script can be generated (e.g., manually by the quality assurance personnel), and a user simulation program can execute the test script to simulate the user actions that previously led to discovery of an issue in an attempt to recreate the issue. Manual generation of test scripts can be complex and time-consuming.

In accordance with some implementations of the present disclosure, automated techniques or mechanisms are used to identify user interactive regions of a UI of a program. A "user interactive region" refers to any region of a UI that includes an element with which a user can interact, such as by making a selection, making a text input, manipulating an object, and so forth. A representation of the UI is generated that includes elements (arranged in a hierarchical manner for example, such as in a tree structure) representing respective user interactive regions of the UI. A user can modify and/or select certain elements of the representation of the UI for use in generating a test script for testing the program by simulating user actions with respect to user interactive regions represented by the selected elements.

Figure 1:
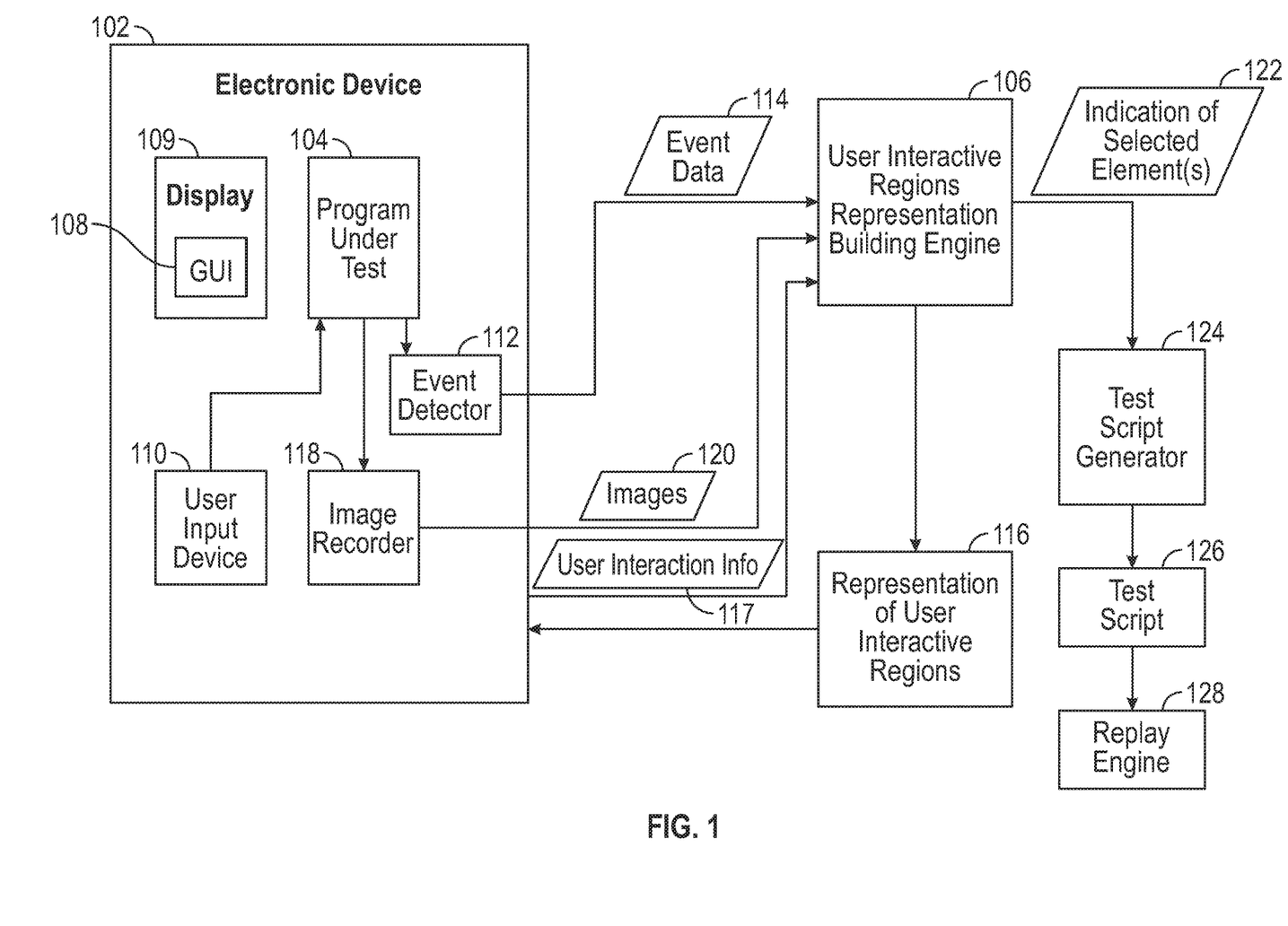
FIG. 1 is a block diagram of an arrangement according to some examples.

FIG. 1 is a block diagram of an example arrangement that includes an electronic device 102 in which a program under test 104 is executed. Examples of the program 104 can include any of the following: a web browser, a game application, a three-dimensional (3D) simulation application, and so forth.

The arrangement includes a user interactive regions representation building engine 106 for building a representation of user interactive regions of a GUI 108 presented by the program under test 104 during execution of the program under test 104. The GUI 108 is displayed by a display device 109 that is part of or coupled to the electronic device 102.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The electronic device 102 includes a user input device 110, which can be used by a user at the electronic device 102 to make selections of UI elements in the GUI 108 presented by the program under test 104. Examples of the user input device 110 can include any or some combination of the following: a mouse device, a keyboard, a touchscreen, a touchpad, and so forth.

The electronic device 102 includes an event detector 112 to detect an event corresponding to a user action made with respect to the GUI 108, such as with the user input device 110. The event detector 112 can be implemented using machine-readable instructions executable in the electronic device 102, or as a hardware processing circuit. The event detector 112 outputs event data 114 to the user interactive regions representation building engine 106. The event data 114 includes information representing events corresponding to user actions made with respect to the GUI 108 and detected by the event detector 112.

The electronic device 102 further includes an image recorder 118, which can record images of the GUI 108 as a user interacts with the GUI 108. The image recorder 118 can be implemented using machine-readable instructions executable in the electronic device 102, or as a hardware processing circuit.

The images captured by the image recorder 118 can be part of video frames captured by the image recorder 118. Video frames can refer to a continual sequence of image frames. Alternatively, the images captured by the image recorder 118 can include still images of the GUI 108 as a user interacts with the GUI 108. The image recorder 118 outputs images 120 of different states of the GUI 108 as the user interacts with the GUI 108 to the user interactive regions representation building engine 106.

The user interactive regions representation building engine 106 can be executed in a system that is separate from the electronic device 102. In such examples, the event data 114 and images 120 can be transmitted by the electronic device 102 over a network to the user interactive regions representation building engine 106. In other examples, the user interactive regions representation building engine 106 can be part of the electronic device 102.

The user interactive regions representation building engine 106 is able to identify a user interactive region in the GUI 108 based on the event data 114 and the images 120. The user interactive region identified by the user interactive regions representation building engine 106 corresponds to a UI element of the GUI 108 that can be selected by a user. As used here, selection of a UI element by a user can refer to any type of interaction between the user and the UI element. Examples of UI elements include any or some combination of the following: text boxes or text fields, control buttons, menus, pop-up dialog boxes, and so forth.

The user interactive regions representation building engine 106 can add an element representing the identified user interactive region to a representation 116 of user interactive regions. The representation 116 of user interactive regions can be in the form of a tree or other hierarchical structure. Elements in the representation 116 can represent respective different user interactive regions. If arranged in a hierarchical manner, a first element representing a first user interactive region that depends from a second element representing a second user interactive region can indicate that the first user interactive region is presented by the GUI 108 in response to user interaction with the second user interactive region.

In examples where the representation 116 of user interactive regions is in the form of a tree, a root node of the representation 116 can represent the first GUI screen of the GUI 108 presented by the program under test 104 when the program under test 104 is first started. Successive child nodes can be added to the representation 116 to represent user interactive regions identified by the user interactive regions representation building engine 106. A grandchild node can in turn be added to a child node in the tree, and so forth.

The user interactive regions representation building engine 106 can iteratively build up the representation 116 of user interactive regions. Once the user interactive regions representation building engine 106 has identified a user interactive region based on the event data 114 and the images 120 received from the event detector 112 and the image recorder 118, respectively, the user may be prompted (by the user interactive regions representation building engine 106 sending an indication to the electronic device 102) to make a further user input to cause further event data 114 and further images 120 to be sent to the user interactive regions representation building engine 106 for identifying a further user interactive region and adding an element representing the further user interactive region to the representation 116.

Once the user interactive regions representation building engine 106 has completed building the representation 116 of user interactive regions, the representation can send the representation 116 to the electronic device 102, to cause display of the representation 116 in the display device 109. Alternatively, the representation 116 can be sent to another device.

A user can interact with the representation 116, where the interaction can cause modification of the representation 116 or selection of a part of the representation 116. Information 117 relating to user interaction with the representation 116 can be sent by the electronic device 102 to the user interactive regions representation building engine 106.

Based on user selection of a part of the representation 116 (as indicated in the information 117), where the selected part can include a number (one or greater than one) of elements representing respective user interactive regions, an indication 122 of the selected element(s) can be provided by the user interactive regions representation building engine 106 to a test script generator 124. The indication 122 can include information representing the selected element(s).

The test script generator 124 produces, based on the selected user interactive region(s) specified by the indication 122, a test script 126 for testing the program under test 104. The test script generator 124 can include a hardware processing circuit or a combination of a hardware processing circuit and machine-readable instructions.

The test script 126 includes program code. The test script 126 includes UI test objects that represent respective UI elements of the GUI 108. The UI test objects included in the test script 128 include the selected user interactive regions based on interaction by a user with the representation 116, as indicated by the indication 122.

The test script 126 further includes representations of a sequence of user actions that are to be performed on UI elements represented by the UI element test objects in the test script 126. The representations of user actions can be added to the test script 126 based on user-provided information regarding what user actions are to be simulated with respect to the UI elements represented in the test script 126. For example, a user may generate a file that describes what user actions are to be applied to the UI elements.

As another example, the user actions to be added to the test script 126 can be those corresponding to a monkey test, which involves applying a random collection of user inputs with respect to UI elements to test the program under test 104.

The test script 126 is provided to a replay engine 128, which can include a simulation program that executes the test script 126. In some examples, the test script 126 can include a compiled code that can be executed by the replay engine 128. In other examples, the test script 126 can include interpreted code that can be interpreted and executed by the replay engine 128. Executing the test script 126 by the replay engine 128 recreates (simulates) user actions described in the test script 126, which are applied to the program under test 104 in an effort to debug issues associated with the program under test 104. The user actions include selections of UI elements represented by test objects in the test script 126, where such UI elements include the UI element(s) indicated by the indication 122.

Although FIG. 1 shows the user interactive regions representation building engine 106, the test script generator 124, and the replay engine 128 as being outside of the electronic device 102, it is noted that in further examples, any or some combination of the interactive area identification engine 106, the test script generator 126, and the replay engine 130 can be part of the electronic device 102.

Figure 2:
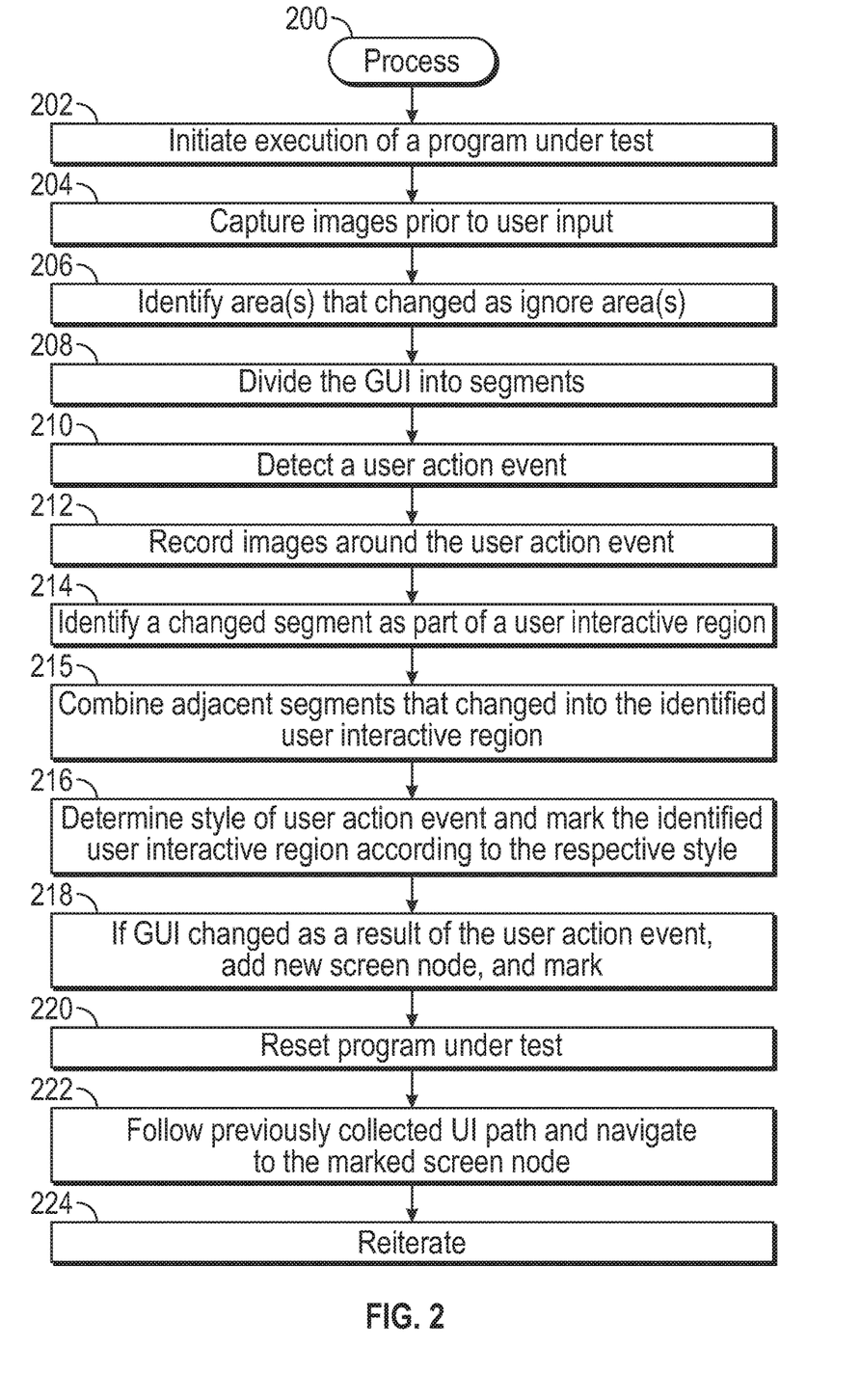
FIG. 2 is a flow diagram of a process according to some examples.

FIG. 2 is a flow diagram of a process 200 that can be performed by various components of the arrangement shown in FIG. 1, according to some examples. Although FIG. 2 shows a specific order of tasks, it is noted that in other examples, the tasks can be performed in a different order, some of the tasks can be omitted or replaced with other tasks, and/or additional tasks may be included in the process 200.

The process 200 initiates (at 202) execution of the program under test 104. In some examples, the initiation of the program under test 104 can be performed in a stateless way, such as by using a script. Starting the program under test 104 in a stateless way refers to the program under test 104 being initiated as if the program under test was started for the first time.

Prior to any user input being provided with respect to the GUI 108 of the program under test 104 that has been initiated, the image recorder 118 captures (at 204) multiple images of the GUI 108 of the program under test 104 during a time interval in which no user input events occurred.

The user interactive regions representation building engine 106 identifies (at 206) area(s) in the collection of images that changed, even in the absence of user action events. Such identified area(s) that changed are likely dynamically changing areas (e.g., advertisement banners, background regions with changing graphics, etc.), and thus are not user interactive regions. The identified area(s) is (are) marked by the user interactive regions representation building engine 106 as "ignore" areas. The ignore areas are not selected as regions corresponding to UI elements.

The user interactive regions representation building engine 106 divides (at 208) the GUI 108 into relatively small segments, where each segment can include a block of pixels (e.g., five-by-five pixels or blocks of other specified sizes). The dimensions of a block of pixels that make up a segment can be customizable by the user or another entity (e.g., a program or a machine). The segments are the portions of the GUI 108 in which the user interactive regions representation building engine 106 attempts to detect changed states in response to a user action event.

The user interactive regions representation building engine 106 receives a user action event, which can be simulated user action event (as simulated by a simulator (not shown), or an actual user action event received in response to actuation of the user input device 110 (FIG. 1).

The event detector 112 detects (at 210) the user action event, and the image recorder 118 records (at 212) images around the user action event. The recorded images can include a first set of images before the user action event, and a second set of images after the user action event. A set of images can include a predetermined number of images (one image or multiple images).

The user interactive regions representation building engine 106 identifies (at 214) a segment (from among the segments divided at 208) that changed in the first and second sets of images. In other words, the user interactive regions representation building engine 106 seeks to identify a given segment in the recorded images that has a first state (the pixels of the given segment have first values) in the first set of images before the user action event, and a different second state (the pixels of the given segment have different second values) in the second set of images after the user action event. The given segment that changed from a first state before the user action event to a different second state after the user action event is likely part of a user interactive region that was changed due to a user action (e.g., a user input of text, a user click, a user key press, a user touch, etc.) made in GUI 108.

The identified segment that change state in response to the user action event is marked by the representation building engine 106 as part of a user interactive region. Note that there may be multiple segments identified as changing states in response to the user action event. Such adjacent segments can be combined (at 215) into a single user interactive region and marked accordingly. The combining of adjacent segments can be performed in an iterative manner.

Also, the user interactive regions representation building engine 106 determines (at 216) whether the user action event is click style or type style. A click style user action event corresponds to a UI element that is selectable based on a pointer device selection or touchscreen selection (e.g., a mouse input causing a cursor to hover over the UI element to make a selection, a click of a mouse device or other pointer device, a touch of a touchscreen or touchpad, etc.). A type style user action event corresponds to a UI element in which text or other information is input (e.g., such as a text box). Although specific examples of styles of user action events are noted above, other types of styles can be included in other examples. The determination of the style of the user action event allows the user interactive regions representation building engine 106 to mark the identified user interactive region according to the respective style.

The user interactive regions representation building engine 106 further checks if the GUI 108 changed as a result of the user action event. If so, that means that what is presented by the GUI 108 changed in response to the user action, where the change can include any of the following, as examples: a pop-up dialog box being presented, a drop down menu being presented, etc. If the GUI 108 changed in response to the user action event, a new node representing a GUI screen is added (at 218) as a child screen node of an existing node representing a UI element that is in the representation 116 of user interactive regions. The new screen node is marked.

Figure 3:
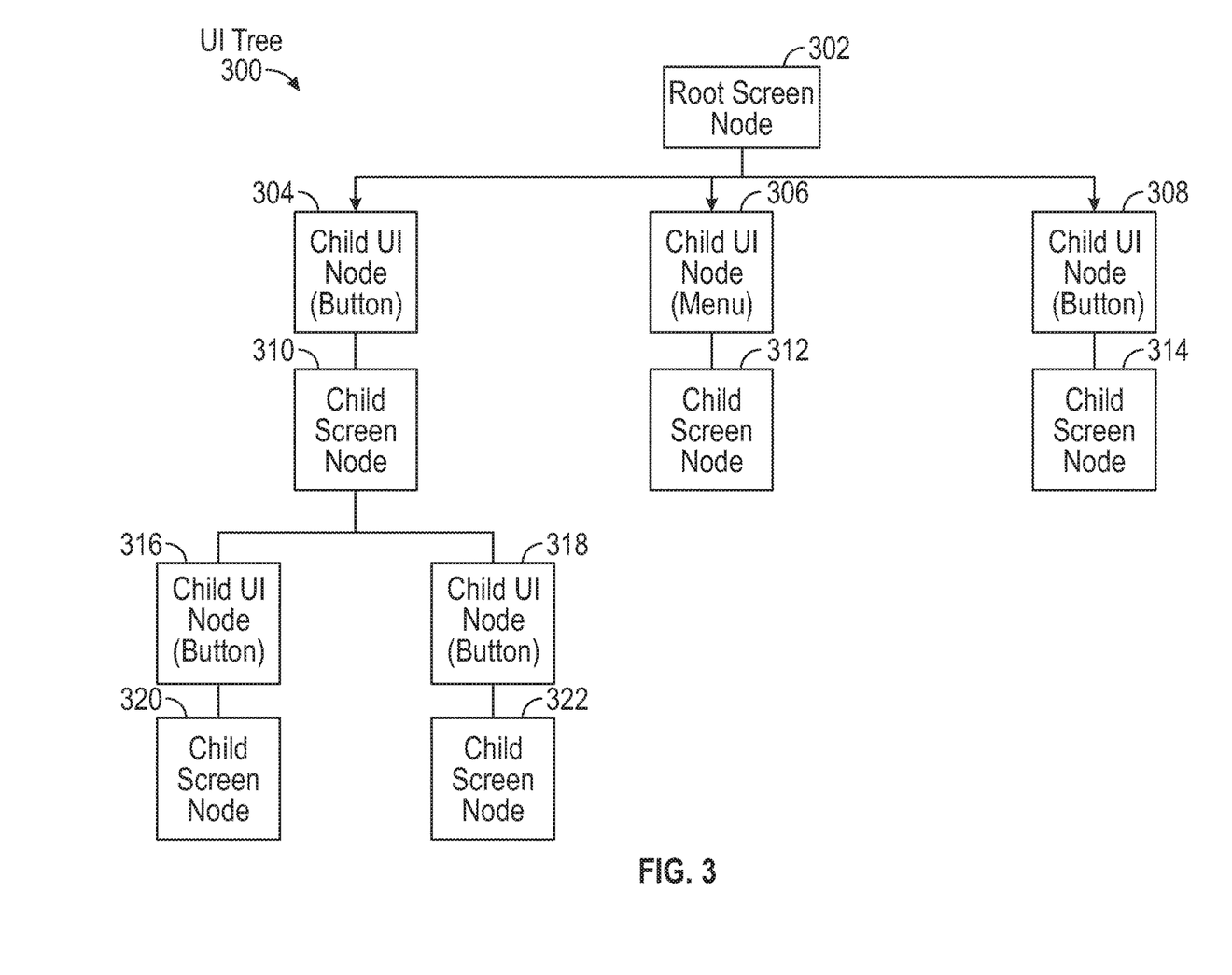
FIG. 3 illustrates a representation of user interactive regions of a user interface (UI) of a program, according to some examples.

FIG. 3 (discussed further below) describes examples of nodes representing UI elements and nodes represent screens in an example representation 116.

The program under test 104 can then be reset (at 220) to go back to the root node of the representation 116 of user interactive regions.

Following the start of the program under test 104 following reset of the program under test 104, the user interactive regions representation building engine 106 follows (at 222) the previously collected UI path (including nodes in the representation 116 that have been built starting at the root node) and dispatches the corresponding user action events to navigate the program UI state to the marked screen node (marked above), and the mark is cleared.

Interaction is then triggered for the next user interactive region, and the tasks 210-222 are re-iterated (at 224) to complete the currently considered UI path.

The process iterates through all the user interactive regions of the current node and loops through tasks 204 to 224, to identify remaining user interactive regions in the GUI 108.

Following the automatic generation of the representation 116 of user inactive regions, the user can interact with the user with representation 116. The interaction can include any or some combination of the following. The user can add additional nodes representing user interactive regions to the representation 116, and can restart the identification of further user interactive regions (according to FIG. 2) from each newly added node. This allows the user to add user interactive regions that may have been missed by the user interactive regions representation building engine 106. The user can also mark any UI path in the representation 116 as an "ignore" path, i.e., a path that is not to be used in generating a test script by the test script generator 124. The marked UI path can include one node or multiple nodes representing respective UI element(s).

The user can also add additional input values (e.g., typed text) for a type style area.

The user can change a style of a user interactive region, such as from click style to type style or vice versa.

The user can mark a node representing a UI element as "ignore" during the generation runtime to reduce the generation time. The user can combine multiple UI paths into a single test script.

Various configurable settings can be specified, including a depth of the GUI 108.

FIG. 3 is a block diagram that shows an example of the representation 116 of user interactive regions, which can be in the form of a UI tree 300. The UI tree 300 includes a root screen node 302, which represents a GUI screen that is displayed upon launching of the program under test 104.

Various child UI nodes 304, 306, and 308 depend from the root screen node 302. The child UI nodes 304, 306, and 308 represent respective UI elements that can be selected by a user in the GUI screen 302 represented by the root screen node 302. For example, the child UI nodes 304 and 308 can represent buttons in the UI, and the child UI node 306 can represent a menu. Selection of the UI elements represented by respective child UI nodes 304, 306, and 308 cause presentation of respective UI screens represented by child screen nodes 310, 312, and 314.

In the example of FIG. 3, the GUI screen represented by the child screen node 310 can further include UI elements selectable by the user. FIG. 3 shows child UI nodes 316 and 318 that represent respective UI elements (e.g., buttons) in the GUI screen represented by the node 310, which when selected by a user cause generation of GUI screens represented by child screen nodes 320 and 322. Although specific UI elements are depicted in FIG. 3, in other examples, other types of UI elements can be represented by child UI nodes of the UI tree 300.

Figure 4:
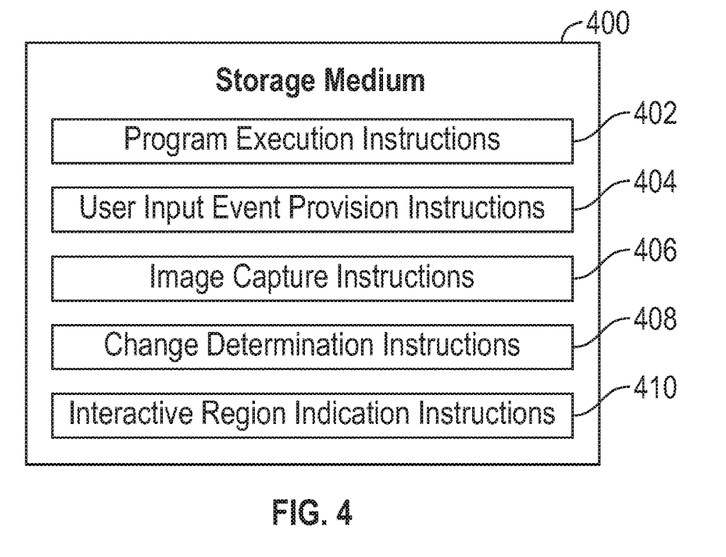
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks. The machine-readable instructions include program execution instructions 402 to execute a program (e.g., 104 in FIG. 1) that generates a UI screen.

The machine-readable instructions include user input event provision instructions 404 to provide a user input event (e.g., a mouse event, a keyboard event, a touch event, etc.) to the program during execution (where the user input event can be detected by the event detector 112 of FIG. 1, for example). The machine-readable instructions further include image capture instructions 406 (e.g., part of the image recorder 118 of FIG. 1) to capture images of the UI screen before and after the user input event.

The machine-readable instructions include change determination instructions 408 to determine, based on the captured images, whether a first region of the UI screen changed in response to the user input event.

The machine-readable instructions further include interactive region indication instructions 410 to indicate the first region as a user interactive region and to add an element representing the user interactive region to a representation (e.g., 116 in FIG. 1) of user interactive regions of a UI of the program.

In some examples, the first region has specified dimensions, the system divides (e.g., task 208 of FIG. 2) the UI screen into a plurality of regions each having the specified dimensions. The determining of whether the first region of the UI screen changed in response to the user input event comprises providing the user input event to each region of the plurality of regions.

In some examples, the user input event causes generation of a second UI screen, and the system to provides a further user input event to the program during execution, further captures images of the second UI screen before and after the further user input event, determines, based on the further captured images, whether a region of the second UI screen changed in response to the further user input event, and indicates the region of the second UI screen as an additional user interactive region and adds an element representing the additional user interactive region to the representation of user interactive regions of the UI.

In further examples, the system receives a user modification of the representation of user interactive regions of the UI, where the user modification is selected from among: adding an element representing a user interactive region to the representation, removing an element representing a user interactive region from the representation, marking a UI path in the representation as an unused path, changing a type of a user interactive region in the representation, marking an element of the representation as unused during generation of the representation, combining multiple UI paths in the representation, or adding an input value to a user interactive region.

Figure 5:
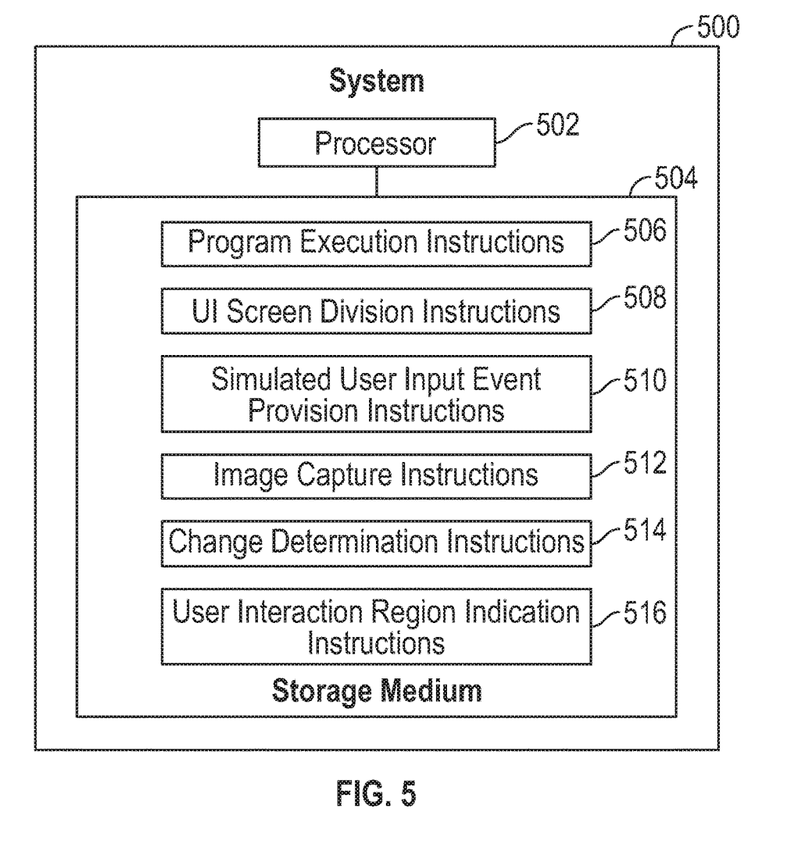
FIG. 5 is a block diagram of a system according to some examples.

FIG. 5 is a block diagram of a system 500 according to some examples. The system 500 includes a hardware processor 502 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 500 further includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions stored in the storage medium 504 includes program execution instructions 506 to execute a program that generates a UI screen. The machine-readable instructions further include UI screen division instructions 508 to divide the UI screen into a plurality of regions. The machine-readable instructions further include simulated user input event provision instructions 510 to provide a simulated user input event to each of the plurality of regions during execution of the program.

The machine-readable instructions include image capture instructions 512 to capture images of the UI screen before and after the user input event. The machine-readable instructions include change determination instructions 514 to determine, based on the captured images, whether a first region of the UI screen changed in response to the user input event. The machine-readable instructions include user interaction region indication instructions 516 to indicate the first region as a user interactive region and to add an element representing the user interactive region to a representation of user interactive regions of a UI of the program.

In some examples, after building a first branch of hierarchically arranged elements of the representation of user interactive regions of the UI, the machine-readable instructions are executable on the hardware processor 502 to start from a given element at a higher hierarchical level in the representation of user interactive regions of the UI, and identify a further element that is at a lower hierarchical level than the given element in a second branch of hierarchically arranged elements of the representation of user interactive regions of the UI.

Figure 6:
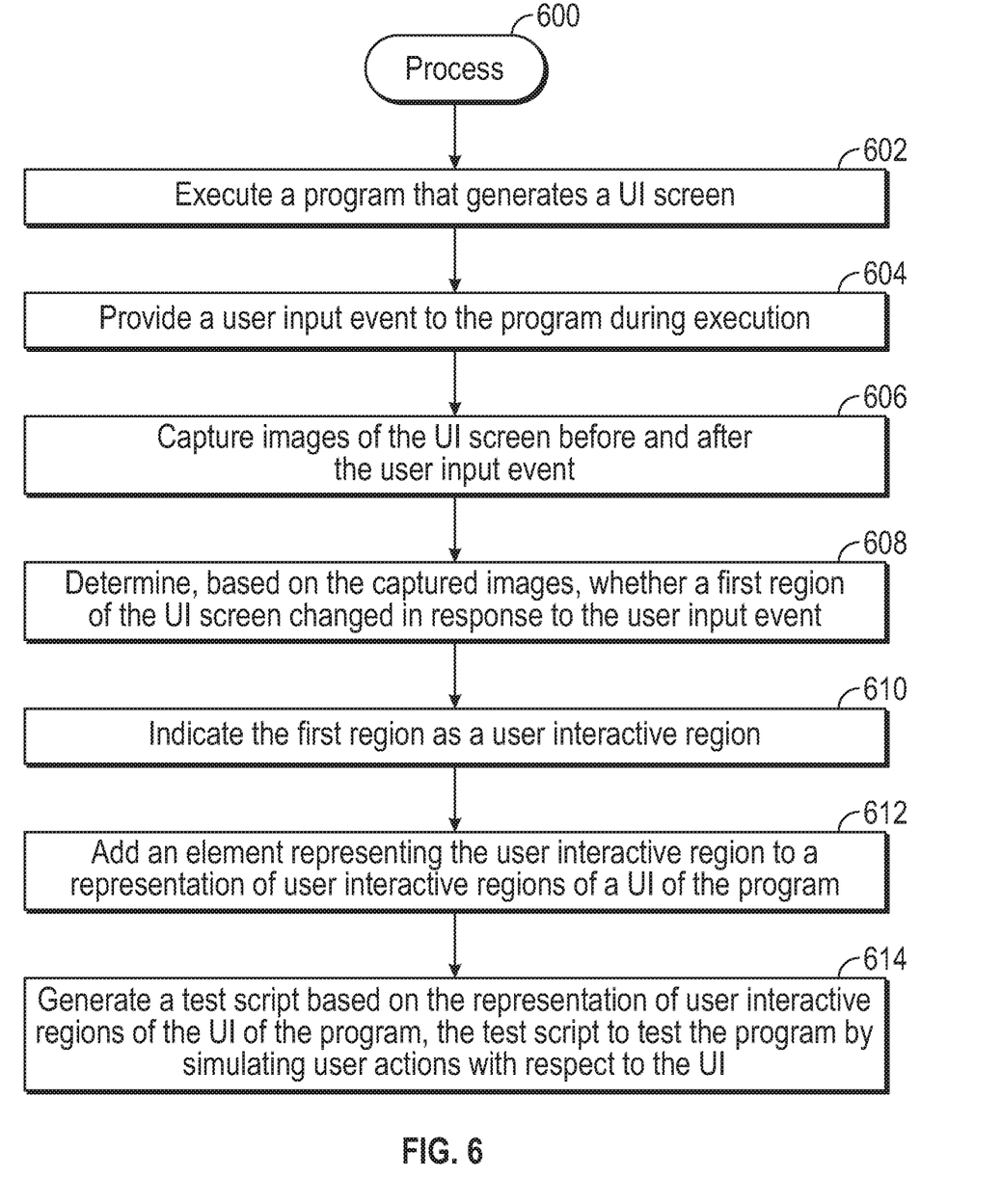
FIG. 6 is a flow diagram of a process according to further examples.

FIG. 6 is a flow diagram of a process 600 according to further examples. Although FIG. 6 shows a specific order of tasks, it is noted that in other examples, the tasks can be performed in a different order, some of the tasks can be omitted or replaced with other tasks, and/or additional tasks may be included in the process 600.

The process 600 includes executing (at 602) a program that generates a UI screen. The process 600 includes providing (at 604) a user input event to the program during execution. The process 600 includes capturing (606) images of the UI screen before and after the user input event.

The process 600 includes determining (at 608), based on the captured images, whether a first region of the UI screen changed in response to the user input event.

The process 600 includes indicating (at 610) the first region as a user interactive region and adding (at 612) an element representing the user interactive region to a representation of user interactive regions of a UI of the program.

The process includes generating (at 614) a test script based on the representation of user interactive regions of the UI of the program, the test script to test the program by simulating user actions with respect to the UI.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
    execute a program that generates a user interface (UI) screen;
    provide a user input event to the program during execution;
    capture images of the UI screen before and after the user input event;
    determine, based on the captured images of the UI screen, whether a first region of the UI screen changed in response to the user input event; and
    indicate the first region as a user interactive region and add an element representing the user interactive region to a representation of user interactive regions of a UI of the program.

2. The non-transitory machine-readable storage medium of claim 1, wherein the first region has specified dimensions, and wherein the instructions upon execution cause the system to:
    divide the UI screen into a plurality of regions each having the specified dimensions,
    wherein determining whether the first region of the UI screen changed in response to the user input event comprises providing the user input event to each region of the plurality of regions.

3. The non-transitory machine-readable storage medium of claim 2, wherein the specified dimensions are customizable based on input from an entity.

4. The non-transitory machine-readable storage medium of claim 1, wherein the instructions upon execution cause the system to:
    capture further images of the UI screen during a time interval in an absence of any user input events;
    detect that a second region of the UI screen changed in the captured images of the UI screen further images; and
    identify the second region as excluded from being a user interactive region.

5. The non-transitory machine-readable storage medium of claim 1, wherein the user input event comprises a mouse event, a keyboard event, or a touch event.

6. The non-transitory machine-readable storage medium of claim 1, wherein the representation of user interactive regions of the UI of the program comprises a UI tree structure comprising nodes representing respective user interactive regions.

7. The non-transitory machine-readable storage medium of claim 1, wherein the instructions upon execution cause the system to:
    provide additional user input events to the program during execution;
    capture further images of the UI screen before and after each of the additional user input events;
    determine, based on the captured images of the UI screen further images, whether additional regions of the UI screen changed in response to the additional user input events; and
    indicate the additional regions as additional user interactive regions and add elements representing the additional user interactive regions to the representation of user interactive regions of the UI of the program.

8. The non-transitory machine-readable storage medium of claim 1, wherein the user input event causes generation of a second UI screen, and wherein the instructions upon execution cause the system to:

provide a further user input event to the program during execution;

further capture images of the second UI screen before and after the further user input event;

determine, based on the further captured images of the second UI screen, whether a region of the second UI screen changed in response to the further user input event; and indicate the region of the second UI screen as an additional user interactive region and add an element representing the additional user interactive region to the representation of user interactive regions of the UI of the program.

9. The non-transitory machine-readable storage medium of claim 8, wherein the representation of user interactive regions of the UI of the program comprises a UI tree structure comprising nodes representing user interactive regions of the UI of the program, the UI tree structure comprising a root node, a first child node of the root node, and a second child node of the first child node, the first child node representing the first region, and the second child node representing the region of the second UI screen.

10. The non-transitory machine-readable storage medium of claim 1, wherein the instructions upon execution cause the system to:

receive a user modification of the representation of user interactive regions of the UI of the program, the user modification selected from among: adding an element representing a user interactive region to the representation, removing an element representing a user interactive region from the representation, marking a UI path in the representation as an unused path, changing a type of a user interactive region in the representation, marking an element of the representation as unused during generation of the representation, combining multiple UI paths in the representation, or adding an input value to a user interactive region.

11. The non-transitory machine-readable storage medium of claim 1, wherein the instructions upon execution cause the system to:

generate a test script using the representation of user interactive regions, the test script comprising information to simulate user actions with respect to the UI of the program.

12. The non-transitory machine-readable storage medium of claim 11, wherein the instructions upon execution cause the system to:

receive user selection of elements of the representation of user interactive regions, wherein the test script is based on the elements of the representation of user interactive regions selected by the user selection.

13. A system comprising:

a processor; and a non-transitory storage medium storing instructions executable on the processor to:

execute a program that generates a user interface (UI) screen;

divide the UI screen into a plurality of regions;

provide a simulated user input event to each of the plurality of regions during execution of the program;

capture images of the UI screen before and after the simulated user input event;

determine, based on the captured images of the UI screen, whether a first region of the UI screen changed in response to the simulated user input event; and indicate the first region as a user interactive region and add an element representing the user interactive region to a representation of user interactive regions of a UI of the program.

14. The system of claim 13, wherein the representation of user interactive regions of the UI of the program comprises a hierarchical arrangement of elements representing respective user interactive regions identified by the instructions.

15. The system of claim 14, wherein the instructions are executable on the processor to:

after building a first branch of hierarchically arranged elements of the representation of user interactive regions of the UI of the program, start from a given element at a higher hierarchical level in the representation of user interactive regions of the UI of the program, and identify a further element that is at a lower hierarchical level than the given element in a second branch of hierarchically arranged elements of the representation of user interactive regions of the UI of the program.

16. The system of claim 13, wherein the instructions are executable on the processor to:

capture further images of the UI screen during a time interval in an absence of any user input events;

detect that a second region of the UI screen changed in the captured images of the UI screen further images; and identify the second region as excluded from being a user interactive region.

17. The system of claim 13, wherein the instructions are executable on the processor to:

receive user selection of selected elements of the representation of user interactive regions; and generate a test script based on the user selection of selected elements, the test script comprising information to simulate user actions with respect to the UI of the program.

18. The system of claim 17, wherein the test script includes information of simulated user actions with respect to user interactive regions represented by the selected elements of the representation of user interactive regions.

19. A method performed by a system comprising a hardware processor, comprising:

executing a program that generates a user interface (UI) screen;

providing a user input event to the program during execution;

capturing images of the UI screen before and after the user input event;

determining, based on the captured images of the UI screen, whether a first region of the UI screen changed in response to the user input event;

indicating the first region as a user interactive region and adding an element representing the user interactive region to a representation of user interactive regions of a UI of the program; and generating a test script based on the representation of user interactive regions of the UI of the program, the test script to test the program by simulating user actions with respect to the UI of the program.

20. The method of claim 19, further comprising:

capturing further images of the UI screen during a time interval in an absence of any user input events;

detecting that a second region of the UI screen changed in the captured further images; and identifying the second region as excluded from being a user interactive region.

\* \* \* \* \*